United States Patent
Gopinath et al.

(10) Patent No.: US 7,664,643 B2
(45) Date of Patent: Feb. 16, 2010

(54) SYSTEM AND METHOD FOR SPEECH SEPARATION AND MULTI-TALKER SPEECH RECOGNITION

(75) Inventors: Ramesh Ambat Gopinath, Millwood, NY (US); John Randall Hershey, White Plains, NY (US); Trausti Thor Kristjansson, White Plains, NY (US); Peder Andreas Olsen, New York, NY (US); Steven John Rennie, Toronto (CA)

(73) Assignees: International Business Machines Corporation; Nuance Communications, Inc., Burlington, MA (US)

( * ) Notice: Subject to any disclaimer, the term of this patent is extended or adjusted under 35 U.S.C. 154(b) by 603 days.

(21) Appl. No.: 11/509,939

(22) Filed: Aug. 25, 2006

(65) Prior Publication Data

US 2008/0052074 A1   Feb. 28, 2008

(51) Int. Cl.
*G10L 15/14* (2006.01)
(52) U.S. Cl. .................. 704/256; 704/243; 704/256.2; 704/256.4
(58) Field of Classification Search .............. 704/255, 704/232, 256, 243, 244, 256.2, 256.4
See application file for complete search history.

(56) References Cited

U.S. PATENT DOCUMENTS

| | | | |
|---|---|---|---|
| 6,950,796 B2 | 9/2005 | Ma | 704/244 |
| 6,963,835 B2 | 11/2005 | Kimball | 704/235 |
| 7,062,433 B2 | 6/2006 | Gong | 704/226 |
| 7,107,210 B2 | 9/2006 | Deng | 704/226 |
| 7,146,319 B2 | 12/2006 | Hunt | 704/254 |
| 7,467,086 B2 * | 12/2008 | Menendez-Pidal et al. | 704/255 |
| 2006/0206333 A1 | 9/2006 | Paek | 704/260 |
| 2006/0229875 A1 | 10/2006 | Acero | 704/261 |

OTHER PUBLICATIONS

P. Varga and R.K. Moore, "Hidden markov model decomposition of speech and noise" ICASSP, pp. 845-848, 1990.

* cited by examiner

*Primary Examiner*—Huyen X. Vo
(74) *Attorney, Agent, or Firm*—Wolf, Greenfield & Sacks, P.C.

(57) ABSTRACT

A method, and a system to execute this method is being presented for the identification and separation of sources of an acoustic signal, which signal contains a mixture of multiple simultaneous component signals. The method represents the signal with multiple discrete state-variable sequences and combines acoustic and context level dynamics to achieve the source separation. The method identifies sources by discovering those frames of the signal whose features are dominated by single sources. The signal may be the simultaneous speech of multiple speakers.

18 Claims, 4 Drawing Sheets

SYSTEM AND METHOD FOR SPEECH SEPARATION AND MULTI-TALKER SPEECH RECOGNITION

FIELD OF THE INVENTION

This invention relates to speech recognition and more particularly to a method and system for identifying, separating, and recognizing simultaneous acoustic signals.

BACKGROUND OF THE INVENTION

Listening to and understanding the speech of two or more people when they talk simultaneously is a difficult task and has been considered one of the most challenging problems for automatic speech recognition.

Single-channel speech separation has previously been attempted using Gaussian mixture models (GMMs) on individual frames of acoustic features. However such models tend to perform well only when speakers are of different gender or have rather different voices (T. Kristjansson, J. Hershey, and H. Attias, "Single microphone source separation using high resolution signal reconstruction" ICASSP, 2004). When speakers have similar voices, speaker-dependent mixture models do not unambiguously identify the component speakers. Although, several models in the literature have attempted to do so either for recognition: (P. Varga and R. K. Moore, "Hidden Markov model decomposition of speech and noise," ICASSP, pp. 845-848, 1990; M. Gales and S. Young, "Robust continuous speech recognition using parallel model combination," IEEE Transactions on Speech and Audio Processing, vol. 4, no. 5, pp. 352-359, September 1996), or enhancement of speech: (Y. Ephraim, "A Bayesian estimation approach for speech enhancement using hidden Markov models.," vol. 40, no. 4, pp. 725-735, 1992; Sam T. Roweis, "One microphone source separation.," in NIPS, 2000, pp. 793-799). Such models have typically been based on a discrete-state hidden Markov model (HMM) operating on a frame-based acoustic feature vector.

The field of speech recognition goes back many years and contains commonly used techniques, methods, and approaches. The following U.S. Pat. Nos. 7,062,433, 7,054,810, 6,950,796, 6,154,722, 6,023,673 all of which are incorporated herein by reference, may serve as general references for techniques of the speech recognition art.

There clearly is a need for improving capabilities in the art of speech recognition when it comes to separate and understand simultaneous speech of two or more speakers.

SUMMARY OF THE INVENTION

In view of the problems discussed above this invention discloses a method, and system involving a computer program product having a computer useable medium with a computer readable program, which program when executed on the computer causes the computer to execute this method, for representing an acoustic signal with multiple discrete state-variable sequences, when the sequences have at least an acoustic state-variable sequence and a context state-variable sequence. Each of the sequences has states in ordered arrangements, which states have associations. The method further involves the coupling the acoustic state-variable sequence with the context state-variable sequence through a first of the associations, and modeling the dynamics of the state-variable sequences with state transitions. These state transitions express additional associations between the states. The acoustic signal may be composed of a mixture of a plurality of component signals, and the method further involves representing individually at least one of the plurality of component signals with the coupled sequences. The acoustic signal is modeled by evaluating different combinations of the states of the state-variable sequences.

This invention further discloses a method, and a corresponding system involving a computer program product having a computer useable medium with a computer readable program, which program when executed on the computer causes the computer to execute this method, which involves observing frames of an acoustic signal, when the acoustic signal is a mixture of M sources, where M is greater or equal to one, and modeling the acoustic signal with N source parameter settings, where $N \geq M$. The method further involves the generation of frames corresponding to the observed frames, by each of the N source parameter settings, and for each one of the observed frames the determination of a degree of matching with the generated frames. The degree of matching is expressed through a set of probabilities, where each probability of the set of probabilities has a corresponding source parameter setting out of the N source parameter settings. The method further involves that for each one of the N source parameter settings, it merges the corresponding probabilities across the observed frames, and it selects P source candidates out of the N source parameter settings, where the selection is determined by the merged corresponding probabilities. The number of selected is such that $M \leq P \leq N$.

BRIEF DESCRIPTION OF THE DRAWINGS

These and other features of the present invention will become apparent from the accompanying detailed description and drawings, wherein.

DETAILED DESCRIPTION OF THE INVENTION

To separate and understand simultaneous speech of two or more speakers it is helpful to model the temporal dynamics of the speech. One of the challenges of such modeling is that speech contains patterns at different levels of detail, that evolve at different time-scales. For instance, two major components of the voice are the excitation, which consists of pitch and voicing, and the filter, which consists of the formant structure due to the vocal tract position. The pitch appears in the short-time spectrum as a closely-spaced harmonic series of peaks, whereas the formant structure has a smooth frequency envelope. The formant structure and voicing are closely related to the phoneme being spoken, whereas the pitch evolves somewhat independently of the phonemes during voiced segments.

At small time-scales these processes evolve in a somewhat predictable fashion, with relatively smooth pitch and formant trajectories, interspersed with sharper transients. If we begin with a Gaussian mixture model of the log spectrum, we can hope to capture something about the dynamics of speech by just looking at pair-wise relationships between the acoustic states ascribed to individual frames of speech data. In addition to these low-level acoustical constraints, there are linguistic constraints that describe the dynamics of syllables, words, and sentences. These constraints depend on context over a longer time-scale and hence cannot be modeled by pair-wise relationships between acoustic states. In speech recognition systems such long-term relationships are handled using concatenated left-to-right models of context-dependent phonemes, that are derived from a grammar or language model.

Typically, models in the literature have focused on only one type of dynamics, although some models have factored the dynamics into excitation and filter components, for instance: John Hershey and Michael Casey, "Audio-visual sound separation via hidden Markov models" in NIPS, 2001, pp. 1173-1180.

Embodiments of this present invention model combinations of a low-level acoustic dynamics with high-level grammatical constraints. The models are combined at the observation level using a nonlinear model known as Algonquin, which models the sum of log-normal spectrum models. Inference on the state level is carried out using an iterative multi-dimensional Viterbi decoding scheme.

Using both acoustic and context level dynamics in the signal separation system produces remarkable results: it becomes possible to extract two utterances from a mixture even when they are from the same speaker.

Embodiments of this invention typically have three elements: a speaker identification and gain estimation element, a signal separation element, and a speech recognition element.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a, computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
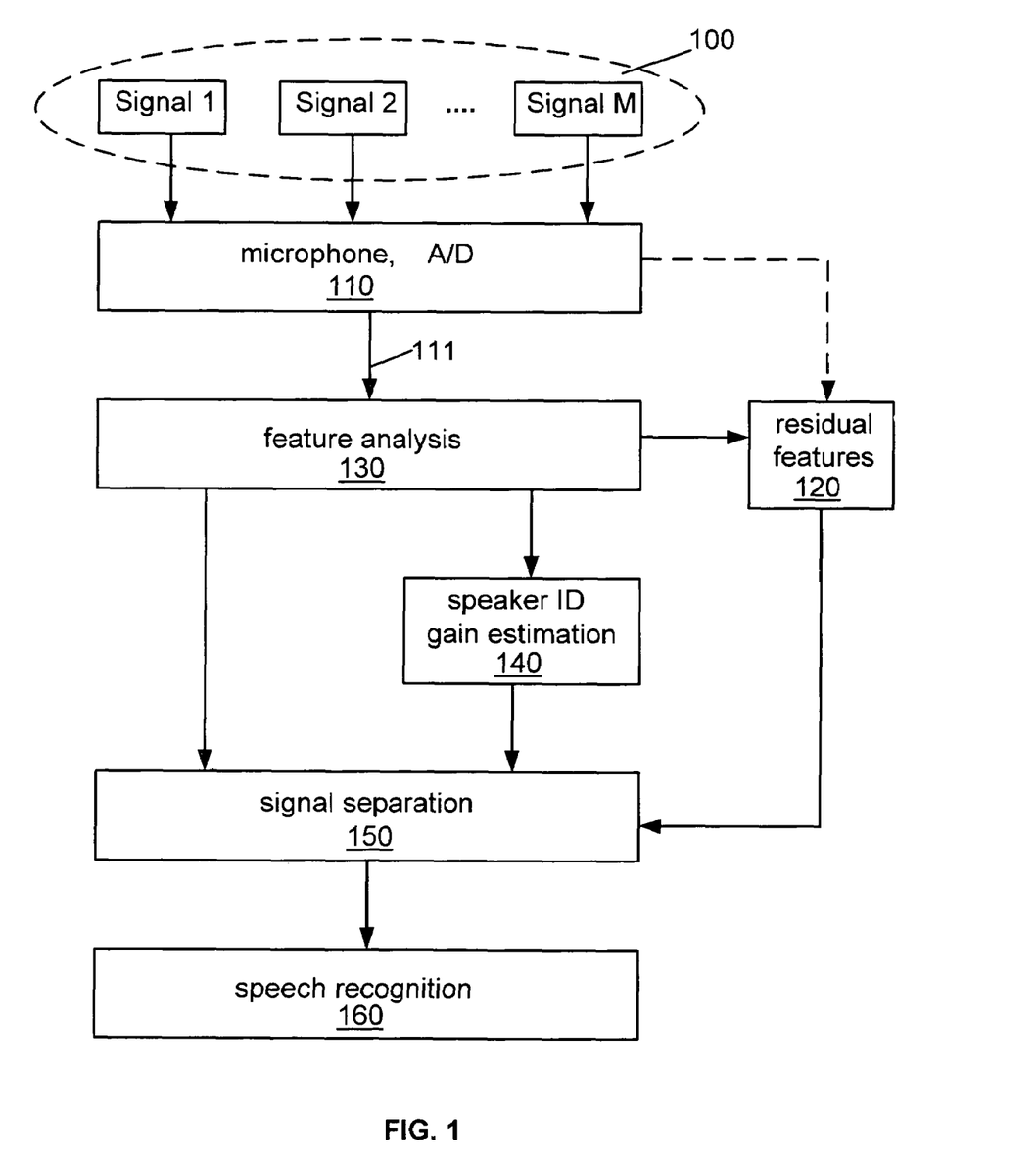
FIG. 1 shows a schematic overview diagram outlining a representative embodiment of a method for identifying, separating, and recognizing simultaneous acoustic signals.

FIG. 1 shows an schematic overview diagram outlining a representative embodiment of a method for identifying, separating, and recognizing simultaneous acoustic signals.

The simultaneous acoustic signals originate from 1 to M (1:M) sources 100. There are many type of sources that can be considered under various embodiments of the invention. Normally, but not exhaustingly, sources may be speakers, music, noise, chatter noise, or others. Often, one of the sources is a speaker. In a representative embodiment of the invention there are two sources each being a speaker. The two speakers may be of the same, or of different, gender. Or, it can even be the same person, whose voice is used for more than one of the sources. However, there may be only a single source, and the techniques presented in this invention for separating speakers, can be effective in recognizing a single acoustic signal, as well. If given sufficient computer computational resources, there is not obvious upper limit on the number M for possible sources. One, however, would consider M to be typically under 10. At the same time, one may consider the separation of particular sources out of even larger numbers of sources, by treating several sources as only one source of chatter noise. But, as the state of the art stood before the present invention, the separation of even just two speaker sources has not been accomplished. The sources also may have a vide variety of a priory unknown gains, which gains may be determined by the disclosed methods of the invention.

The source signals are combined into a single channel by methods known in the art, such as microphones, A/D converters, and others 110. The output is the acoustic signal 111 to be analyzed and recognized.

Analysis 130 of the acoustic signal 111, which contains the M component signals of the M sources, may proceed along lines know in the art. As one skilled in the art would recognize, the presented measurement conditions should not be read as exclusionary. The acoustic signal is processed on a frame basis. Frames are short segments of an acoustic signal defined at a discrete set of times, and processed into a set of features by various transformations. In an exemplary embodiment of the invention a sequence of frame-based acoustic features are being determined in feature analysis 130. In a representative embodiment of the invention log-power spectrum features are computed at a 15 ms rate from an acoustic signal sampled at 16 KHz. Each frame of samples of the acoustic signal is derived from a 40 ms sequence of samples centered at a point in time 15 ms later than the center of the previous frame. To derive the acoustic features, these acoustic signal frames are multiplied by a tapered window such as a cosine window function, and a 640 point fast Fourier transform (FFT) is used. The DC component is discarded, producing a 319-dimensional log-power-spectrum feature vector. A sequence of these frame based feature vectors are the sequence of features derived from the acoustic signal.

The disclosed method models the acoustic signal 111, and receiving the observed features of the signal from feature analysis 130, the speaker ID and gain estimation element 140 is capable to find our the identity of the M sources, and to determine the gains of the M individual sources.

Having determined the identity and gain of the sources, the signal separation element 150 of the invention separates the acoustic signal to its M individual acoustic components. In a typical embodiment of the invention feature analysis 130 and the speaker ID and gain element 140 supply inputs for the signal separation element 150. Output from signal separation 150 are M individual acoustic signals, which then may proceed to speech recognition 160.

Additional, so called residual features, such as the phases and gain of the acoustic signal, are also extracted 120, for possible use in reconstructing estimated speech signals.

For illustrative purposes various elements of the disclosure are presented mainly for a particular embodiment, namely one where M is equal to two, and both sources are speakers. The identities of the two speakers are not known, and the intensity of their utterances, the gain of their respective signals, is also unknown. It is known that the two speakers are selected out of a group of N speakers, where N is between 30 and 40. The N speakers are available for supplying training data, and the range of the possible context for the speech of the two simultaneous speakers is also known. However, presentation of this particular embodiment should not be read in a restrictive manner, as already discussed general aspects of the invention have broad applicability, as it would also be recognized by one skilled in the art.

Speaker-dependent acoustic models are used because of their advantages when separating different speakers. One has to recognize speech in acoustic signals that are mixtures of two component signals, designated a and b. All mathematical notations used in this disclosure are standard ones, known by one skilled in the art.

The model for mixed speech in the time domain is (omitting the channel) $y_t = x_t^a + x_t^b$ where $x_t^a$ and $x_t^b$ denote the sequence of acoustic features for component signals a and b, and $y_t$ denotes the sequence of acoustic features of the mixed acoustic signal at time t. The features comprise the log-power spectrum of a frame of an acoustic signal at time t. One approximates this relationship in the log power spectral domain in terms of a probability distribution over $y_t$ for any given values of $x_t^a$ and $x_t^b$:

$$p(y|x^a, x^b) = N(y; ln(\exp(x^a) + \exp(x^b)), \Psi)$$

where $\psi$ is a covariance matrix introduced to model the error due to the omission of phase, and time has been omitted for clarity. The symbol N indicates a normal, or Gaussian, distribution. Other models for the combination of two feature vectors may also be used.

One models each sequence of acoustic features $x_t$ by coupling them with a sequence of discrete acoustic state variables, $s_t$ for time t=1, 2, ..., T. Each of these random variables take on a discrete state from a finite set {1, 2, ..., N s}, where $N_s$ is the number of states a the state variable s can take.

One models the probability distribution of the features x of the each source signal given their acoustic state s as Gaussian: $p(x|s) = N(x; \mu_s, \Sigma_s)$. Thus, for example, one defines the probability of $x^a$ given $s^a$ as $p(x^a|s^a) = N(x^a; \mu_{s^a}, \Sigma_{s^a})$, and the probability of $x^b$ given $s^b$ as $p(x^b|s^b) = N(x^b; \mu_{s^b}, \Sigma_{s^b})$ for the two sources a and b. The joint probability distribution of the observation y, and source features, $x^a$ and $x^b$, given the acoustic state variables $s^a$, and $s^b$ is:

$$p(y, x^a, x^b | s^a, s^b) = p(y|x^a, x^b) p(x^a|s^a) p(x^b|s^b) \quad (1)$$

Where time has been left out for clarity.

Figure 2:
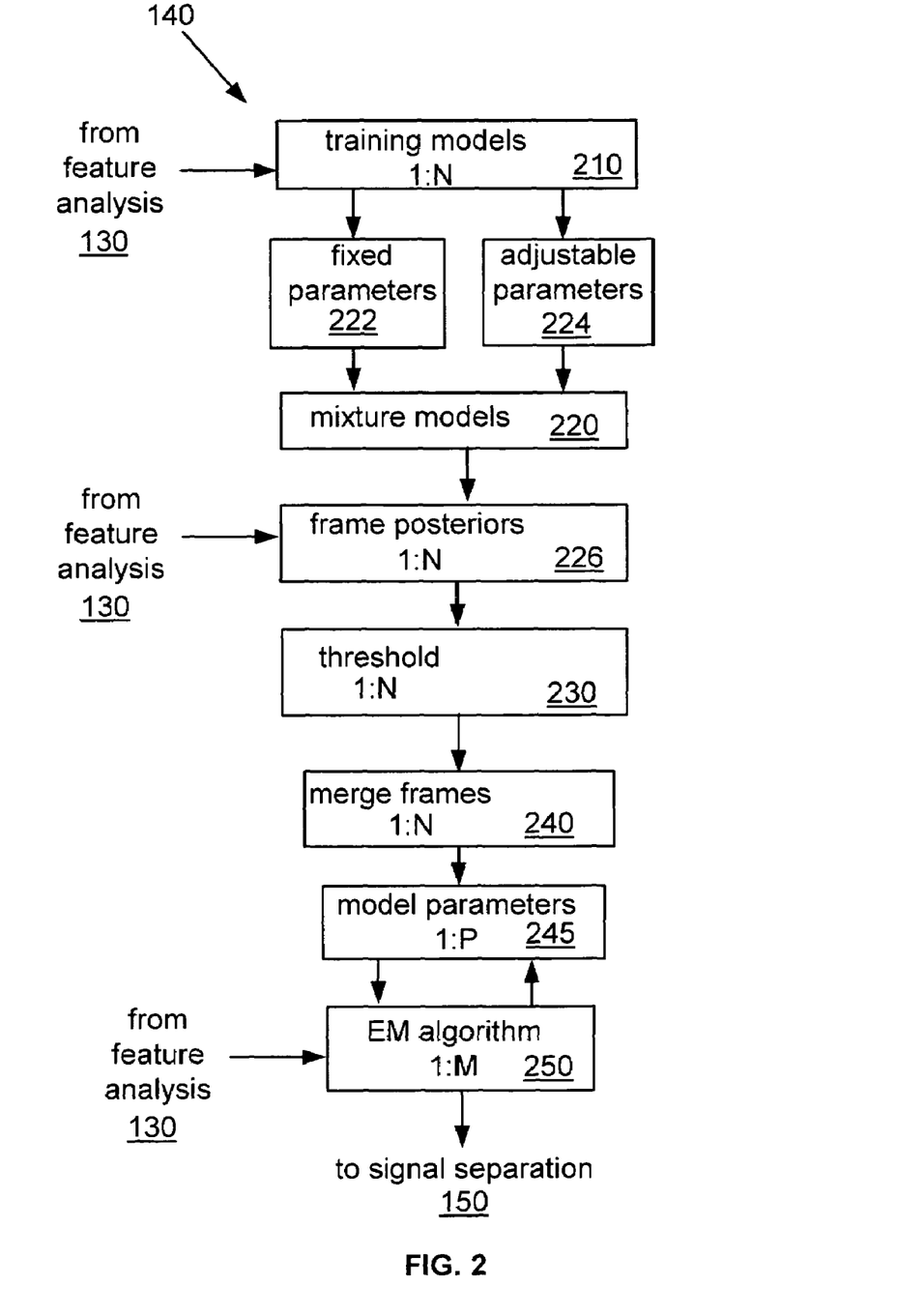
FIG. 2 shows a schematic overview diagram outlining a representative embodiment of a method for identifying multiple sources in an acoustic signal.

FIG. 2 shows a schematic overview diagram outlining a representative embodiment of a method for identifying multiple sources in an acoustic signal. A particular embodiment when the M sources are two speakers, which two can be any one of N speakers, N being between about 30 to 40, is further used to expound on the invention. The gains and identities of the two speakers are unknown. The gains of the two speaker are mixed at Signal to Noise Ratios (SNRs) ranging from 6 dB to −12 dB.

In identifying the two speakers and their respective gains, one uses the previously presented mixture models. These models may be trained 210 using the feature analysis 130 on data with a narrow range of gains, so it is necessary to match the models to the gains of the signals during the actual identification. This means that one has to estimate both the speaker identities and their gains in order to successfully infer the source signals. However, the number of speakers, N, and range of SNRs in a typical embodiment may make it too expensive to consider every possible combination of models and gains. Hence an efficient model-based method for identifying the speakers and estimating the gains has been invented.

Following training 210, one may take various path in dealing with speaker parameters. One can assume that all parameters of each speech source (speaker) are fixed 222, and one only has a choice of selecting weights for each speaker's presence in the acoustic signal 111. The embodiment under discussion, namely when it is known that the acoustic signal 111, contains speech of two speakers, falls in this category. With the exception for the two speakers, of unknown identity, that are known to be present, the weights of all other N potential speakers is zero. For other embodiments, for instance, when potential sources are less well defined, one may choose to allow source parameters to be adjustable 224 according to the observations. In such cases one identifies as many potential sources, as many component signals are found in the acoustic signal 111, namely one deals with a situations when M=N.

The mixture models 220 assume that even if the great majority of observed frames are mixtures of acoustic sources, there will be a relatively small number of frames which are dominated by a single source. One has to identify and utilize frames that are dominated by a single source to determine what sources are present in the mixture. To identify frames dominated by a single source, the signal for each processing frame t is modeled as generated from a single source class (speaker) c, and assume that each of N source parameter setting is described by a mixture model 220:

$$p(y_t|c) = \sum_g \sum_{s^c} \pi_{s^c} \pi_g N\left(y_t; \mu_{s^c} + g, \Sigma_{s^c}\right)$$

here the gain parameter g takes a range of discrete values, such as for example {6, 3, 0, −3, −6, −9, −12} with prior $\pi_g$, and $\pi_{s^c}$ is the prior probability of state s in source class c. Although not all frames are in fact dominated by only one source, such a model will tend to ascribe greater likelihood to the frames that are dominated by one source. The mixture of gains allows the model to be gain-independent at this stage.

To model a useful estimate of p(c|y) one may apply the following algorithm:

1. Compute the normalized likelihood of c given $y_t$ for each frame $$b_{y_t}(c) = p(y_t|c) \Big/ \sum_{c'} p(y_t|c')$$

2. Approximate the component class likelihood by $$p(y|c) = \sum_t \phi(b_{y_t}(c)) \cdot b_{y_t}(c)$$

where $\Phi(b_{y_t}(c))$ is a confidence weight that is assigned based on the structure of $b_{y_t}(c)$, defined here as $$\phi(b_{y_t}(c)) = \begin{cases} 1 & \max_c b_{y_t}(c) > \gamma \\ 0 & \text{otherwise} \end{cases}$$

where $\gamma$ is a chosen threshold.

3. Compute the source class posterior as usual via: $p(c|y) \sim p(y|c)p(c)$.

This method for estimating p(c|y) is useful in situations where there may be many frames that are not dominated by a single source. The normalized likelihoods are summed rather than multiplied, because the observations may be unreliable. For instance, in many frames the model will assign a likelihood of nearly zero, even though the source class is present in the mixture. The confidence weight $\Phi(b(c))$ also favors frames that are well described by a single component, that is, where the likelihood $b_{y_t}(c)$ is high for some component c.

Using such mixtures models 220 one generates the frames with each one of the N source parameter settings, whereby for each one of the observed frames one determined a set of probabilities, with each member of the set, $b_{y_t}(c)$, corresponds to one of the N parameter settings, which is indicated by the "(c)" dependence.

The merged probabilities over time, meaning across the frame set, subjected to a thresholding operation give the p(y|c) expression from above. In a reprehensive embodiment of the invention the merging operation is carried out summing. Also there are many other procedures possible instead of the thresholding, which could structure according to need the posteriors for the N parameter settings, or classes.

Using the mixtures models 220, and input from feature analysis 130, the frame posteriors can be calculated 226, for all N potential sources. A thresholding operation 230 is carried out on the N posterior probabilities to select only those speaker candidates that have a highly peaked probability of being one of the actual M speakers. The value of the threshold $\gamma$ is a chosen to yield an appropriate number P of source candidates after the probabilities are merged. This merging may take the form of summing probabilities that are over the set threshold value, as in step 2 above, and the probability of speaker c being in the acoustic signal, p(y|c), is obtained. The posteriors are calculated as: $p(c|y) \sim p(y|c)p(c)$. Having thus merged the probabilities of all N potential speakers, through all the frames, one may select P of them with the highest probability, thus one has the P model parameter settings 245 which describe the best candidates. In a typical embodiment $M \leq P \leq N$.

The output of stage 245 is a short list of candidate source IDs and corresponding gain estimates. One then estimates the posterior probability of combinations of these candidates and refines the estimates of their respective gains via an approximate expectation—maximization (EM) procedure 250. This EM procedure is know in the art, see for instance: Dempster et al., Maximum Likelihood from Incomplete Data via the EM Algorithm, Journal of the Royal Statistical Society, Series B, 39, 1-38 (1977). In the EM procedure one may use a max model of the source interaction likelihood. This max model is also known in the art, see for instance: P. Varga and R. K. Moore, "Hidden Markov model decomposition of speech and noise", ICASSP, pp. 845-848, 1990 and S. Roweis, "Factorial models and refiltering for speech separation and denoising," Eurospeech, pp. 1009-1012, 2003. The max model is inputted into the EM procedure from the feature analysis 130.

Details of the EM procedure for the discussed particular embodiment, with two speakers as components in the acoustic signal, out of N potential speakers, may proceed as follows:

E-step: using the max model, compute $p_i(s_t^j, s_t^k|y_t)$ for all t in iteration i, for a hypothesis of speaker IDs j and k, out of the P candidates.

M-step: Estimate $\Delta g_{j,i}$ via:

$$\Delta g_{j,i} = \alpha_i \frac{\sum_t \sum_{s_t^j, s_t^k} p_i(s_t^j, s_t^k|y_t) \sum_{d \in D_{s_t^j, s_t^k}} \frac{\Delta g_j \cdot k \cdot d \cdot t}{\sigma_{s_t^j, s_t^k, d}^2}}{\sum_t \sum_{s_t^j, s_t^k} p_i(s_t^j, s_t^k|y_t) \sum_{d \in D_{s_t^j, s_t^k}} \frac{1}{\sigma_{s_t^j, s_t^k, d}^2}}$$

where $$\Delta g_{j,k,d,t} = (y_{d,t} - \mu_{s_t^j, s_t^k, d} - g_{j,i-1})$$

and $Ds_t^j|s_t^k$ is all dimensions where $$\mu_{s_t^j, d} - g_{j,i-1} > \mu_{s_t^k, d} - g_{k,i-1}$$

and $\alpha_I$ is a learning rate.

With such modeling, over all mixture cases and conditions of tests, one can obtain over 98% overall speaker identification accuracy.

When the N source parameter settings are variable, one can use M variable parameter candidates to model M component sources with the discussed mixture models. After the frame posteriors 226, the parameters in the speaker models are adjusted to best fit the observed frames.

The element 140 for identifying multiple sources in an acoustic signal outputs the parameters of the M component sources that are present in the acoustic signal 111. Element 150 of the invention separates the acoustic signal to its M individual acoustic components. Again, an embodiment where the signal to be separated is a mixture of two speakers, is discussed in most detail. However, presentation of this embodiment should not be read in a restrictive manner, general aspects of the invention are not limited to two speakers, as it would be recognized by one skilled in the art.

Figure 3:
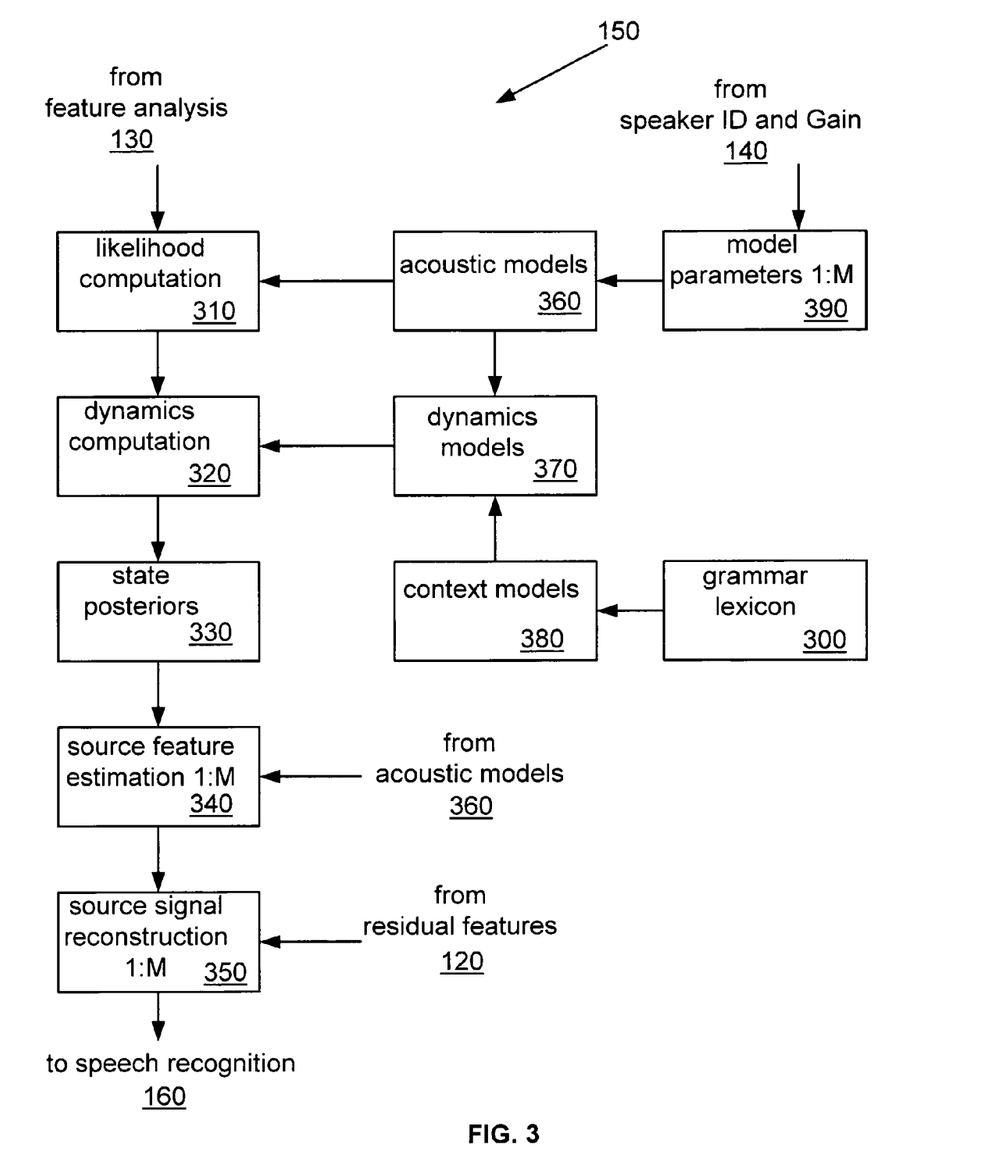
FIG. 3 shows a schematic overview diagram outlining a representative embodiment of a method for separating simultaneous acoustic signals.

FIG. 3 shows a schematic overview diagram outlining a representative embodiment of a method for separating simultaneous acoustic signals. The separator element 150 executes the task primarily through a likelihood computation 310 and a dynamics computation 320. The likelihood computation receives inputs from feature analysis 130 containing a sequence of frame-based acoustic features of the acoustic signal 111. The identifying element 140 supplies the parameters of the M component signals at an input 390 of the separator element, which in a representative embodiment of the invention are the parameters for two speakers. In performing the likelihood computation 310 the frame based sequence of features derived from the acoustic signal is coupled with the acoustic state-variable sequence through the fourth of the associations. The acoustic state-variable sequence comprises the acoustic models 360 derived from the parameters of the M component signals.

In a typical embodiment of the invention for the acoustic models 360 each of the component signals, $x_t^a$ and $x_t^b$ for speaker a and b are modeled by a conventional, known in the art, continuous observation HMM with Gaussian mixture models (GMM) for representing the observations. The main difference between the use of such model in this embodiment of the invention and the conventional use is that observations are in the log-power spectrum domain. Hence, given an HMM state $s^a$ of speaker a, the distribution for the log spectrum vector $x^a$ is modeled as $p(x^a|s^a) = N(x^a; \mu_{s^a}, \Sigma_{s^a})$.

In the likelihood computation 310 one has to take into account the joint evolution of the two signals simultaneously. Therefore one needs to evaluate the joint state likelihood $p(y|s^a, s^b)$ at every time step. The iterative Newton-Laplace method known as Algonquin can be used to accurately approximate the conditional posterior $p(x^a, x^b|s^a, s^b)$ from equation (1) above as Gaussian, and to compute an analytic approximation to the observation likelihood $p(y|s^a, s^b)$. The Algonquin is known in the art, for instance: T. Kristjansson, J. Hershey, and H. Attias, "Single microphone source separation using high resolution signal reconstruction" ICASSP, 2004, incorporated herein by reference. The approximate joint posterior $p(x^a, x^b|y)$ is therefore a GMM and the minimum mean squared error (MMSE) estimators $E[x^i|y]$, or the maximum a posteriori (MAP) state-based estimate $(s^a, s^b) = \arg\max_{sa,sb} p(s^a, s^b|y)$ may be analytically computed and used to form an estimate of $x^a$ and $x^b$, given a prior for the joint state $\{s^a, s^b\}$. The prior for the states $s^a$, $s^b$ are supplied by a model of dynamics described below Performing such likelihood computations is one example of a method of evaluating different combinations of the states of the state-variable sequences, for the purpose of finding an optimum sequence, under some predefined measure of desirability. However, one skilled in the art may notice that methods other than the iterative Newton-Laplace can be used to compute the likelihood of the states combinations.

In a traditional speech recognition system, speech dynamics are captured by state transition probabilities. This approach was taken with the difference that both acoustic dynamics and grammar dynamics has been incorporated via state transition probabilities 370, through the second and third of the associations.

To model acoustic level dynamics, which directly models the dynamics of the log-spectrum, one estimates transition probabilities between the acoustic states for each speaker. The dynamics of acoustic state-variable sequences $s_t^a$ and $s_t^b$ are modeled by associating consecutive state variables via state transitions. The state transitions are formulated as conditional probabilities, $p(s_t^a|s_{t-1}^a)$ and $p(s_t^b|s_{t-1}^b)$, for $t=2, \ldots, T$. For $t=1$, one defines the initial probabilities as $p(s_1^a)$ and $p(s_1^b)$. The parameters of these dynamics are derived from clean data by training. In a typical embodiment of the invention the acoustic state-variable sequence is expressed in a hidden Markov model (HMM) with Gaussian mixture models (GMM). In HMM-s states have associations through state transitions which involve consecutive states. However, in general, in differing embodiments of the inventions one may not use HMM-s to represent state-variable sequences, and transitions resulting in associations may involve non-consecutive states. The state transitions in the acoustic state-variable sequence as presented here encapsulate aspects of the temporal dynamics of the speech, and express the second of the associations introduced in this disclosure.

In an exemplary embodiment of the invention, 256 Gaussians were used, one per acoustic state, to model the acoustic space of each speaker. Dynamic state priors on these acoustic states require the computation of $p(y|s^a, s^b)$ the evaluation of $256^2$, or over 65,000 state combinations.

In order to model longer-range dynamics, one also introduces context state variable sequences $v_t^a$ and $v_t^b$ 380. These are coupled 370 to the corresponding acoustic state variables $s_t^a$ and $s_t^b$, through associations formulated as conditional probabilities. Such associations of the acoustic state-variable sequence with the context state-variable sequence is the first of the associations introduced in this disclosure.

The state transitions of the acoustic state variables and the conditional probabilities of the acoustic state variables given the corresponding context state variables can be expressed as a conditional probability, $p(s_t^a|s_{t-1}^a, v_{t-1}^a)$ and $p(s_t^b|s_{t-1}^b, v_{t-1}^b)$, for $t=2, \ldots T$. For $t=1$, one defines the initial probabilities as $p(s_1^a|v_1^a$ and $p(s_1^b|v_1^b)$. One can approximate these probabilities using a simpler set of associations formulated as a product of two factors $p(s_t^a|s_{t-1}^a) p(s_t^a|v_{t-1}^a) z$, where z is a normalizing constant and similarly for component signal b. Other functions of such factors can also be used. The probabilities $p(s_t^a|v_{t-1}^a)$ are learned from training data where the context state sequences and acoustic state sequences are known for each utterance.

The dynamics of context state-variable sequences $v_t^a$ and $v_t^b$ are modeled by associating consecutive state variables via state transitions. The state transitions are formulated as conditional probabilities, $p(v_t^a|v_{t-1}^a)$ and $p(v_t^b|v_{t-1}^b)$, for $t=2, \ldots, T$. For $t=1$, one defines the initial probabilities as $p(v_1^a)$ and $p(v_1^b)$.

The state transitions for the context state variable sequences are derived 300 from a grammar defining the possible word utterances for some speech recognition scenario. The words in the grammar are translated into a sequence of phones using a dictionary of pronunciations that map from words to three-state context-dependent phoneme states. The sequences of phone states for each pronunciation, along with self-transitions constitute the transition probabilities for the context state variable sequences. These transitions can be formulated as a Finite State Machine (FSM). The transition probabilities derived in this way are sparse in the sense that most state transition probabilities are zero. The state transitions in the context state-variable sequence as presented here encapsulate aspects of the temporal dynamics of the speech, and express the third of the associations introduced in this disclosure.

In an exemplary embodiment of the invention for a given speaker, the grammar may consists of up to several thousands of states. In one particular test the grammar consisted of 506 states. However, in general, in differing embodiments of the inventions one may not use a FSM to represent context state-variable sequences, and specific training may be substituted with broad context rules.

Figure 4A:
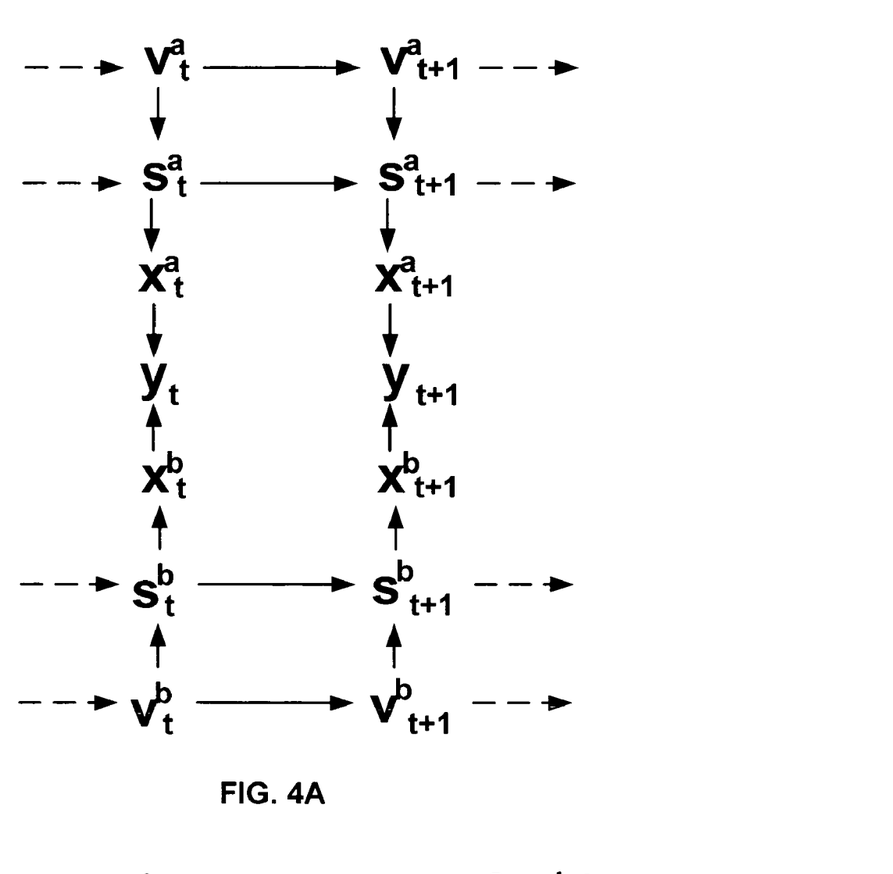
FIG. 4A shows the coupling of state variables and signal at successive time steps.
Figure 4B:
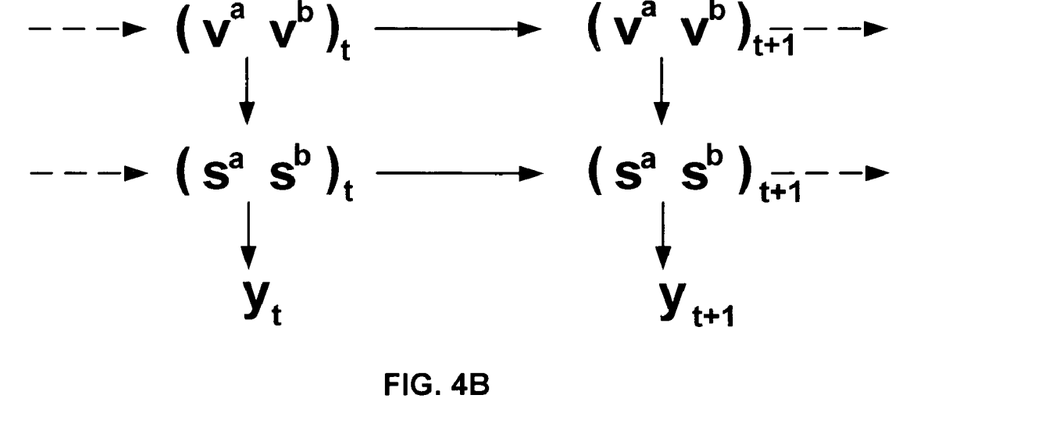
FIG. 4B shows the coupling of state variables and signal at successive time steps through products of state variables.

FIG. 4A shows the coupling of state variables and signal at successive time steps, as needed for use in the dynamics computation 320. At each time step . . . t, t+1, . . . for each speaker, the component signal sequences $x^a$ and $x^b$ are combined to model the acoustic signal y, the acoustic state variable sequences $s^a$ and $s^b$ are coupled through the fourth of the associations to the component signal sequences, and the context state variable sequences $v^a$ and $v^b$ are coupled through the first of the associations to the acoustic state variable sequences. FIG. 4B an alternate, but fundamentally equivalent mode of coupling variable sequences, where Cartesian products of each of the state variables for the two speakers are computed first, and then these Cartesian products are coupled to each other and to the signal sequence.

The dynamics calculations 320 are typically carried out by a multi, typically two, dimensional Viterbi algorithm. In general Viterbi algorithms are known in the art, for instance, U.S. Pat. No. 7,031,923 to Chaudhari et al, incorporated herein by reference, uses a Viterbi algorithm to search in finite state grammars. The Viterbi algorithm estimates the maximum-likelihood state sequence $s_{1...T}$ given the observations $x_{1...T}$. The complexity of the Viterbi search is $O(TD^2)$ where D is the number of states and T is the number of frames. For producing MAP estimates of the 2 sources, one requires a 2 dimensional Viterbi search which finds the most likely joint state sequences $s^a_{1...T}$ and $s^b_{1...T}$ given the mixed signal $y_{1...T}$ as was proposed in P. Varga and R. K. Moore, "Hidden Markov model decomposition of speech and noise", ICASSP, pp. 845-848, 1990, incorporated herein by reference. On the surface, the 2-D Viterbi search appears to be of complexity $O(TD^4)$. However, it can be reduced to $O(TD^3)$ operations.

In the Viterbi algorithm, one wishes to find the most probable paths leading to each state by finding the two arguments $s_{t-1}^a$ and $s_{t-1}^b$ of the following maximization:

$$\max_{s_{t-1}^a, s_{t-1}^b} p(s_t^a|s_{t-1}^a)p(s_t^b|s_{t-1}^b)p(s_{t-1}^a,$$

$$s_{t-1}^b|y_{1...t-1}) = \max_{s_{t-1}^a} p(s_t^a|s_{t-1}^a)\max_{s_{t-1}^b} p(s_t^b|s_{t-1}^b)p(s_{t-1}^a, s_{t-1}^b|y_{1...t-1}).$$

For each state $s_t^b$, one first computes the inner maximum over $s_{t-1}^b$, as a function of $s_{t-1}^a$, and store the max value and its argument. Then one computes, for each state $s_t^a$ and $s_t^b$, the outer maximum over $s_{t-1}^a$, using the inner max evaluated at $s_{t-1}^a$. Finally, one looks up the stored argument, $s_{t-1}^b$, of the inner maximization evaluated at the max $s_{t-1}^a$, for each state $s_t^a$ and $s_t^b$. One can also exploit the sparsity of the transition matrices and observation likelihoods, by pruning unlikely values. Using both of these methods the implementation of 2-D Viterbi search is faster than the acoustic likelihood computation 310 that serves as its input. In alternate embodiments of the invention one might use different algorithms than Viterbi. Instead of Viterbi, one can also use other method known in art, such as the "forward-backward" algorithm, or a "Loopy belief propagation" as a general method for inference in intractable models.

Using the full the acoustic/grammar dynamics condition in inference 330, may be computationally complex because the full joint posterior distribution of the grammar and acoustic states, $(v^a \times s^a) \times (v^b \times s^b)$ is required and is very large in number. Instead one may perform approximate inference by alternating the 2-D Viterbi search between two factors: the Cartesian product $s^a \times s^b$ of the acoustic state sequences and the Cartesian product $v^a \times v^b$ of the grammar state sequences. When evaluating each state sequence one holds the other chain constant, which decouples its dynamics and allows for efficient inference. This is a useful factorization because the states $s^a$ and $s^b$ interact strongly with each other and similarly for $v^a$ and $v^b$. In fact, in the same-talker condition, when both speakers are actually recordings of one person, the corresponding states exhibit an exactly symmetrical distribution. The 2-D Viterbi search breaks this symmetry on each factor.

Once the maximum likelihood joint state sequence is found one can infer the source log-power spectrum of each signal and reconstruct 340 them with methods known in the art. Finally from the source features one can reconstruct the actual acoustic signals for each source 350. Each individual source than can be analyzed by conventional speech recognition methods.

Many modifications and variations of the present invention are possible in light of the above teachings, and could be apparent for those skilled in the art. The scope of the invention is defined by the appended claims.

We claim:

1. A method, performed in a computer having at least one processor and at least one memory element, the method comprising:
   representing, by the computer, an acoustic signal with multiple discrete state-variable sequences, wherein said sequences comprise an acoustic state-variable sequence and a context state-variable sequence, wherein each of said sequences comprises states in ordered arrangements, wherein states pertaining to said acoustic state-variable sequence and states pertaining to said context state-variable sequence comprise associations;
   coupling, by the computer, said acoustic state-variable sequence with said context state-variable sequence through a first of said associations; and
   modeling, by the computer, dynamics with state transitions for said acoustic state-variable sequence and said context state-variable sequence, wherein said state transitions express respectively a second and a third of said associations.

2. The method of claim 1, wherein in modeling of said dynamics, said state transitions involve consecutive states within said ordered arrangements.

3. The method of claim 2, wherein said acoustic state-variable sequence is expressed in a hidden Markov model with Gaussian mixture models.

4. The method of claim 2, wherein said context state-variable sequence is expressed in a Finite State Machine.

5. The method of claim 1, wherein said acoustic signal comprises a mixture of a plurality of component signals, said method further comprising:
   representing individually at least one of said plurality of component signals with said coupled sequences; and
   modeling said acoustic signal by evaluating different combinations of said states of said state-variable sequences.

6. The method of claim 5, wherein at least one of said plurality of component signals is a speech signal.

7. The method of claim 6, wherein all of said plurality of component signals are speech signals.

8. The method of claim 7, wherein said plurality of component signals are two speech signals.

9. The method of claim 2, wherein said method further comprises:
   coupling a sequence of features derived from said acoustic signal with said acoustic state-variable sequence through a fourth of said associations; and estimating likelihoods of said state-variable sequences.

10. The method of claim 9, wherein said estimating of said likelihoods is carried out by a Viterbi algorithm, wherein said Viterbi algorithm finds sequences of maximum likelihood.

11. The method of claim 9, wherein said evaluating different combinations of said states comprises obtaining Cartesian products of said dynamics of said sate-variable sequences pertaining to each of said plurality of component signals.

12. The method of claim 11, wherein said estimating of said likelihoods is carried out by a Viterbi algorithm, wherein said Viterbi algorithm is made to alternate between said Cartesian products pertaining to said acoustic state-variable sequences and said Cartesian products pertaining to said context state-variable sequences.

13. The method of claim 9, wherein said method further comprises:
   obtaining training data; and
   using said training data for adjusting said associations.

14. The method of claim 9, wherein said likelihoods are used in estimating most likely features of said plurality of component signals.

15. The method of claim 14, wherein said most likely features of said plurality of component signals are used to separate out each of said plurality of component signals from said acoustic signal and to construct separate individual acoustic signals for each of said plurality of component signals.

16. The method of claim 9, wherein said likelihoods are used in estimating a least average error for said plurality of component signals.

17. A computer readable memory that stores a computer readable program, wherein said computer readable program when executed on a computer causes said computer to:
   represent an acoustic signal with multiple discrete state-variable sequences, wherein said sequences comprise an acoustic state-variable sequence and a context state variable sequence, wherein each of said sequences comprises states in ordered arrangements, wherein states pertaining to said acoustic state-variable sequence and states pertaining to said context state-variable sequence comprise associations;
   couple said acoustic state-variable sequence with said context state-variable sequence through a first of said associations; and
   model dynamics with state transitions for said acoustic state-variable sequence and said context state-variable sequence, wherein said state transitions express respectively a second and a third of said associations.

18. The computer readable memory of claim 17, wherein said acoustic signal comprises a mixture of a plurality of component signals, further causes said computer to:
   represent individually at least one of said plurality of component signals with said coupled sequences; and
   model said acoustic signal by evaluating different combinations of said states of said state-variable sequences.

* * * * *

UNITED STATES PATENT AND TRADEMARK OFFICE
CERTIFICATE OF CORRECTION

PATENT NO. : 7,664,643 B2
APPLICATION NO. : 11/509939
DATED : February 16, 2010
INVENTOR(S) : Gopinath et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 778 days.

Signed and Sealed this

Thirtieth Day of November, 2010

David J. Kappos
*Director of the United States Patent and Trademark Office*